(12) United States Patent
Lex

(10) Patent No.: US 7,630,516 B2
(45) Date of Patent: Dec. 8, 2009

(54) METHOD AND DEVICE FOR CHARACTERIZING SURFACES

(75) Inventor: Konrad Lex, Koenigsdorf (DE)

(73) Assignee: BYK Gardner GmbH, Geretsried (DE)

( * ) Notice: Subject to any disclaimer, the term of this patent is extended or adjusted under 35 U.S.C. 154(b) by 686 days.

(21) Appl. No.: 10/924,361

(22) Filed: Aug. 23, 2004

(65) Prior Publication Data

US 2005/0046870 A1 Mar. 3, 2005

(30) Foreign Application Priority Data

Aug. 26, 2003 (DE) ............................... 103 39 227

(51) Int. Cl.
*G06K 9/00* (2006.01)
(52) U.S. Cl. .................. 382/108; 356/600; 703/2
(58) Field of Classification Search ............ 703/2; 356/630, 600; 374/17, 161; 73/105, 1.89; 382/108
See application file for complete search history.

(56) References Cited

U.S. PATENT DOCUMENTS

| | | | | |
|---|---|---|---|---|
| 4,710,908 A * | 12/1987 | Ohshima et al. | ......... | 369/44.11 |
| 5,092,676 A * | 3/1992 | Harata et al. | ................. | 356/600 |
| 5,398,113 A * | 3/1995 | de Groot | ...................... | 356/497 |
| 5,608,527 A * | 3/1997 | Valliant et al. | ............... | 356/600 |
| 5,974,160 A * | 10/1999 | Shiratori et al. | ............. | 382/112 |
| 5,978,750 A * | 11/1999 | Adams | ........................ | 702/168 |
| 6,262,818 B1 * | 7/2001 | Cuche et al. | .................... | 359/9 |
| 6,310,688 B1 * | 10/2001 | Kao et al. | .................... | 356/369 |
| 6,721,694 B1 * | 4/2004 | Lambrecht et al. | ............. | 703/2 |
| 7,026,626 B2 * | 4/2006 | Harrison | ...................... | 250/372 |
| 7,045,169 B2 * | 5/2006 | Freeman et al. | ............. | 427/180 |
| 7,139,083 B2 * | 11/2006 | Fielden et al. | ............... | 356/630 |
| 7,239,587 B2 * | 7/2007 | Liebert et al. | ............. | 369/53.14 |
| 2001/0013935 A1 * | 8/2001 | Watanabe et al. | ........... | 356/600 |

* cited by examiner

*Primary Examiner*—Kidest Bahta
*Assistant Examiner*—Carlos Ortiz Rodriguez
(74) *Attorney, Agent, or Firm*—Greer, Burns & Crain, Ltd.

(57) ABSTRACT

A method for characterizing surfaces wherein a first and a second quantity characteristic of roughness of the surface are determined, a first derived quantity is determined by applying mathematical operations to at least said first characteristic quantity and a second derived quantity is determined by applying mathematical operations to at least said second characteristic quantity; wherein an interrelationship between the first and the second derived quantity will be formed which at least partially specifies at least the optical properties of the surface. Finally, the first and the second derived quantities are represented in a common reference frame.

3 Claims, 7 Drawing Sheets a b c d a b c d

METHOD AND DEVICE FOR CHARACTERIZING SURFACES

BACKGROUND

The present invention relates to a method for characterizing surfaces. The invention will be described below with reference to the surfaces of car bodies. However, we wish to point out that the invention may also be applied in other fields.

The optical impression of surfaces such as surfaces of car bodies is decisively determined by their qualities such as color, smoothness, gloss, orange peel, distinctness of image (DOI) and the like; wherein particularly the smoothness or roughness of a surface plays a decisive role as to the optical impression it gives.

Therefore a specification of the optical properties of surfaces is called for. Systems for specifying the colors of surfaces have been known in the prior art.

Many different factors determine roughness of surfaces such as the mean deviation from an ideally smooth surface, periodicities of individual deviations and the like. The industrial production of vehicle surfaces or car bodies calls for the possibility of explicitly characterizing or classifying any occurring roughness or the optical impression caused by such roughness.

SUMMARY

The object of the present invention is therefore to provide a system and a method for characterizing the optical impression of surfaces.

The method of the invention determines a first quantity characteristic of roughness of the surface. A further process step determines a second quantity characteristic of roughness of the surface. Then, a first derived quantity is determined by applying mathematical operations to at least said first characteristic quantity and a second derived quantity is determined by applying mathematical operations to at least said second characteristic quantity. According to the invention, an interrelationship is then formed between the first and the second derived quantities which at least partially specifies at least the optical properties of the surface.

Finally, the first and the second derived quantities or their interrelationship, respectively, are outlined in a common reference frame.

Herein, surface roughness is understood to mean a surface running not precisely on a predetermined geometrical plane or surface but having individual surface segments or sectors of the surface deviating therefrom. Such deviations may for example be elevations or dimples in the surface. Such deviations may in particular be microscopic.

Preferably a third quantity characteristic of surface roughness is determined. As outlined above, surface roughness depends on many factors. By means of introducing a third characteristic quantity, surface irregularities can therefore be more precisely illustrated or said surface irregularities can be more precisely approximated, respectively.

It is preferred to apply the first, the second and/or the third characteristic quantity to determining both of the derived quantities. This means that both of the derived quantities are dependent on at least one common characteristic quantity. Unlike with the known systems for evaluating colors in which the individual evaluating factors are substantially independent of each other, the system of the invention for characterizing the optical impression of surfaces caused by irregularities has shown that the individual characteristic quantities cannot be considered entirely independently of each other but that deviations of one characteristic quantity may lead to deviations of another characteristic quantity.

Furthermore it is preferred to determine a third derived quantity. Said third derived quantity may for example be applied to still more precisely approximate the optical impression. However, it should not be overlooked that a user-friendly system is among other things characterized in that the actual conditions are specified as accurately as possible by as few parameters as possible. Experiments have revealed that using four characteristic quantities results in simple handling of the system and high accuracy in specifying the optical impressions caused by roughness. We wish to point out that the third derived quantity may also be a quantity characteristic of roughness of the surface.

It may be preferred to determine more than three characteristic quantities to be included for determining the derived quantities. For example the first derived quantity could be based on three or more characteristic quantities. It is in particular preferred that for determining the third derived quantity, a plurality of characteristic quantities is included wherein a particularly preferred embodiment of the method provides for individual characteristic quantities to be rated or weighted higher than others are. In this way one can for example take into account that the human eye will notice some characteristic quantities more readily than others.

It is particularly preferred to select at least one characteristic quantity from a group of quantities including arithmetic mean values, geometric mean values, harmonic mean values, quadratic mean values, maxima, minima, variances, standard deviations, Fourier coefficients, mean quadratic deviations and the like. Application of such quantities and in particular of Fourier coefficients allows a particularly advantageous way of specifying roughness or its amplitudes, respectively.

It is preferred that the common reference frame is a coordinate system selected from a group of coordinate systems including spherical-coordinate systems, cylinder-coordinate systems, Cartesian coordinate systems and the like. In this way, the representation of the individual quantities or their interrelationship can be adapted to different applications.

It is particularly preferred to carry out a Fourier transformation for determining the characteristic quantities wherein particularly preferably at least the first and/or the second characteristic quantities are Fourier coefficients. It is preferred that the third characteristic quantity is also a Fourier coefficient.

It is further preferred to measure a surface texture in a first process step and then to sectionalize the measured result by means of Fourier transformation into ranges of different periodicities wherein subsequently the characteristic quantities are determined as being the Fourier coefficients decisive for ranges of different periodicities.

Instead of or in addition to Fourier transformation, a preferred embodiment may also provide filtering in different wavelength ranges wherein the characteristic quantities determined in the individual wavelength ranges are in particular but not exclusively variances or comparable statistical quantities.

It is preferred to use for measuring substantially parallel light such as light from a laser source for scanning the surface to be examined. In a further embodiment of the method of the invention, the light source used is a laser point light source having a specified divergence.

It is further preferred to determine the first and/or the second derived quantities such that they are dependent at least on the first and/or the second characteristic quantity. Dependency is understood to mean in particular a dependency in a mathematical sense, meaning that a value will then be dependent on another value when said value can in particular be represented as a mathematical function of another value. Said dependency takes into account the fact that, as mentioned above, the individual characteristic quantities cannot be considered independently of each other.

In another preferred embodiment, a maximum value is formed which is decisive for the optical characteristics, for obtaining a mathematical interrelationship between at least the first and the second derived quantities. This means that the first and the second derived quantities are brought to a common interrelationship wherein a maximum value or a family of maximum values is specified for said interrelationship. Herein, a deviation of the first derived quantity from a specified value can be compensated by a deviation of the second derived quantity from a value specified for said second derived quantity. For example, an increase of the first derived quantity could be compensated within certain limits by a decrease of the second characteristic quantity. Examples of such a maximum value for a mathematical interrelationship are circular functions such as $$(x-x_1)^2+(y-y_1)^2=a$$

This equation defines for example a circle around the center $(x_1, y_1)$ and having a radius a, wherein a smaller value x can be compensated by a correspondingly larger value y as long as the value x does not exceed the amount of $\sqrt{a}$; wherein the center of this circle does not necessarily have to coincide with the origin of a coordinate system.

Furthermore, these maximum values can be formed by further including the third derived quantity. In such a case, the maximum value or the family of maximum values for the interrelationship could for example be represented as a spherical surface and/or as the surface of another type of rotational ellipsoid. In this case, deviations of one of the three quantities could also be compensated by deviations of the other two quantities.

It is preferred that at least one derived quantity is selected from a group of derived quantities including sums, products, differences, quotients, exponential functions, integrals, differentials, logarithms and the like and random combinations of said quantities. Combinations such as the logarithm of a quotient also fall within the scope of the invention.

It is preferred to plot at least two quantities, at least one of which being a derived quantity, in a coordinate system having two axes perpendicular relative one another. This way of plotting facilitates a 2-dimensional representation.

It is particularly preferred to plot the first derived quantity, the second derived quantity and the third derived quantity in a coordinate system having three axes perpendicular relative one another, wherein a first axis is assigned to the first derived quantity, a second axis to the second derived quantity and a third axis to the third derived quantity.

It is further preferred to represent the first and the second derived quantities in a two-dimensional coordinate system and to represent the third derived quantity in the same coordinate system by distinguishable properties. This procedure serves to plot a point in a two-dimensional system although mathematically, said point is dependent on three quantities.

It is preferred to select said distinguishable properties from a group of optically distinguishable properties including color, gray level, hatching, numbers, symbols and the like as well as combinations thereof. For example if the third derived quantity has a specified value or lies in a specified interval it could be represented by a triangle, and if its value is higher or lies in a specified higher-order interval, by a square or the like.

It is preferred to use the specified intervals for plotting the first and the second derived quantities. This is to be understood such that the derived quantities are not only plotted as to their quality but as precise values within specified intervals such as from −5 to +5, from 0 to 10 or the like.

It is preferred to determine the first and the second derived quantities as quotients of the first, second and third characteristic quantities determined by Fourier analysis or filtering. For example the first derived quantity represents the quotient of the first and the second characteristic quantity and the second derived quantity represents the quotient of the second and the third characteristic quantity. In this way, the second characteristic quantity will influence both of the derived quantities.

The invention further relates to a device for characterizing surfaces comprising an emitter which emits light to a surface to be examined, a receiver which receives the light reflected and/or diffused off the surface to be examined and emits a signal corresponding to said light, and an evaluating unit which evaluates the signal applying any of the methods specified above.

The emitter is preferably a light source, in particular but not exclusively a laser point light source emitting substantially parallel light or light having a specified divergence such as in particular but not exclusively a laser means. However, other radiation sources such as halogen bulbs, LEDs or the like are also conceivable. It is preferred to emit the light to the surface to be examined at a predetermined angle, said angle measuring between 0 degrees and 90 degrees, preferred between 20 degrees and 70 degrees and particularly preferred in the range of 45 degrees.

The receiver is preferably a photosensitive detector or a CCD camera; which in turn emits a signal characteristic of the intensity of the impinging light. It is preferred to evaluate said signal in the evaluating unit by applying Fourier transformation or filtering.

BRIEF DESCRIPTION OF THE DRAWINGS

Further advantages and embodiments of the method of the present invention and of the device of the present invention can be taken from the accompanying drawings.

DETAILED DESCRIPTION OF THE PREFERRED EMBODIMENT

Figure 1:
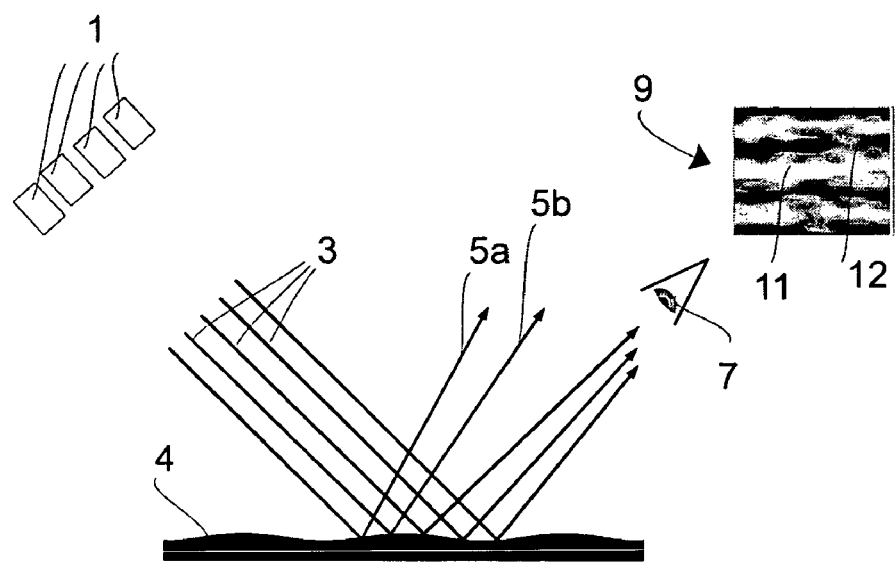
FIG. 1 is a schematic illustration for showing the optical effects of surface irregularities.
Figure 1:
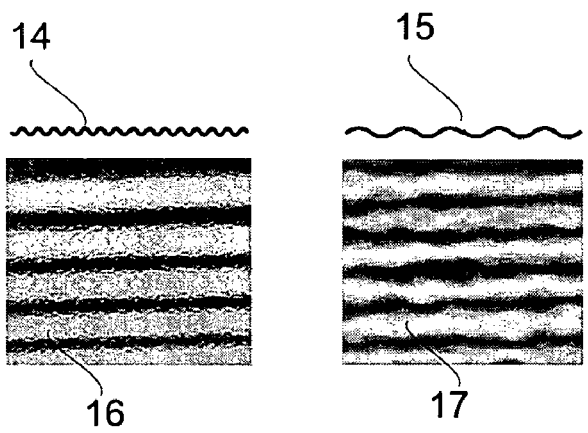

In FIG. 1 the beams 3 emitted from one or more light source(s) k1 impinge substantially parallel on a surface 4. If this were an ideally smooth surface, the beams would be reflected off the surface also parallel. A plurality of light sources such as a plurality of luminescent tubes could be used. Additionally it is also conceivable to use only one light source or sunlight. Then, however, a mask would have to be inserted in the path of radiation from the light source to the surface.

Since, however, the actual quality of the surface is not ideally smooth but has irregularities, the beams 3 are not reflected parallel but in deviant directions as is indicated by the emitted beams 5a and 5b. The beams, running no longer parallel, impinge on the eye of the observer 7. If the reflected beams were for example recorded with a CCD camera or the like, the intensity distribution recorded would not be constant, i.e. the dark and bright areas would not be clearly defined, but it would for example look like the intensity distribution 9 shown in FIG. 1. This intensity distribution comprises high intensity ranges 11 and low intensity ranges 12. The transition from high intensity ranges to low intensity ranges is fuzzy, based on roughness of the surface. Also, as shown in FIG. 1, a collimation of light beams occurs at individual spots resulting in increased intensities there.

Development of the intensity distribution decisively depends on the periodicity of individual rough ranges as the lower part of FIG. 1 shows. For example short-wave roughness 14 results in an intensity distribution 16, and long-wave roughness 15 in an intensity distribution 17. We wish to point out though that the illustration is simplified for better understanding. In this way the optical impression of the examined surface is dependent on the characteristics of the individual rough ranges.

However, the impression which a surface gives also depends on the distance from an observer to an observed object. While with a short distance of observation, for example 40 cm, even small structures will be resolved, a longer distance, for example 3 m, leads to that only large structures can be resolved. In this way the same surface can leave different impressions on an observer based on different distances of observation.

Figure 2:
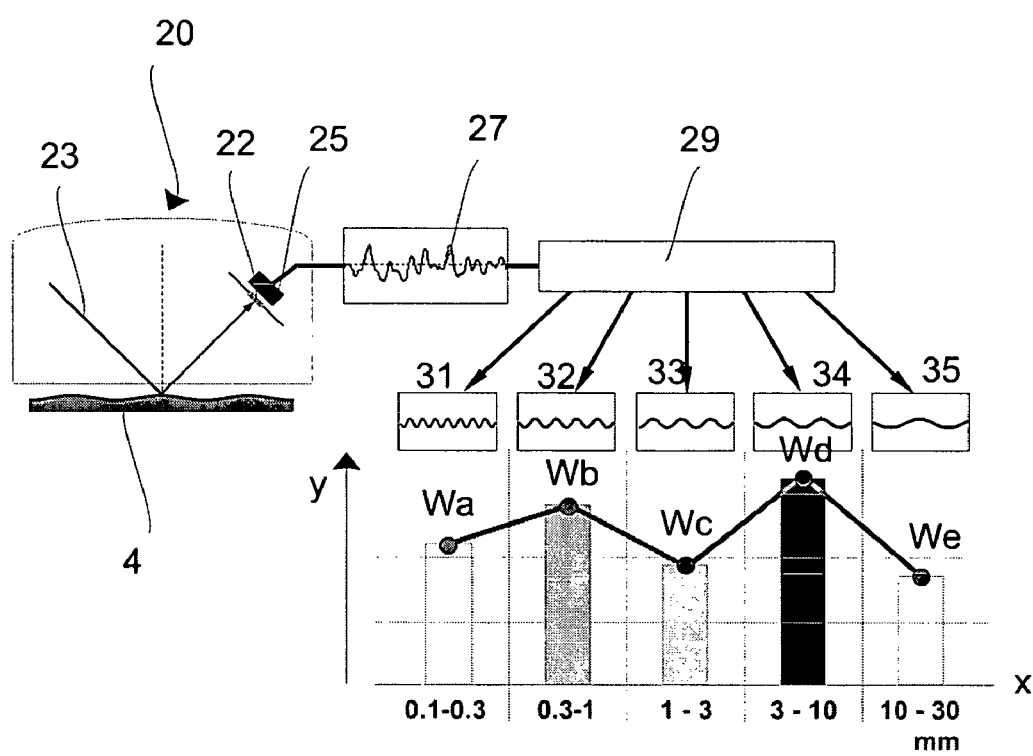
FIG. 2 is a schematic illustration of the evaluation method.

FIG. 2 explains the present method of evaluating the optical characteristics. It is preferred to emit light at a specified divergence, such as light 23 emitting from a laser point light source, to the surface to be examined and to measure the reflected light with a sensor 25. Filter means 22 can be provided additionally. Using a divergent light source allows an enlargement of the image or the intensity distribution, respectively.

Furthermore, the present method serves to vary the position of the device 20 relative the measured surface 4. In this way for example the measurement trace 27 is generated onto which the intensity of the light measured by the sensor is plotted.

Instead of varying the position of the device relative the surface, the surface to be examined can be recorded substantially entirely by means of a plurality of photo sensors such as a CCD camera, and subsequently the resulting intensity distribution is examined in view of the intensities generated. A combination of the two methods is also conceivable, i.e. a recording by means of a plurality of photo sensors being moved relative the surface. This would for example additionally allow an averaging or evaluation of individual surface areas.

The intensity distribution is subsequently evaluated using an evaluating device 29, preferably by carrying out a Fourier transformation.

It is known that every periodic function can be represented by means of a Fourier transformation as a superposition of individual sinusoidal or cosinusoidal curves wherein the following interrelationship applies.

$$x(t) = \frac{a_0}{2} + \sum_{k=1}^{\infty} (a_k \cdot \cos(k \cdot \omega t) + b_k \cdot \sin(k \cdot \omega t))$$

In this interrelationship, x(t) is the function to be represented, in this case the function generating the measurement trace. The Fourier coefficients are $a_k$ und $b_k$. For the angular frequency the interrelationship is $\omega = 2\pi/T$, wherein T is the oscillation time.

The Fourier analysis can be represented as a frequency-amplitude graph by plotting as a vertical line or bar the amplitude of a sine occurring in the sum at the frequency or wavelength.

The original function or in this case the measurement result 27 can be adjusted at any desired accuracy, the accuracy depending on the quantity of the individual Fourier components.

In the example illustrated the measurement result 27 is split in five individual wavelength ranges 31, 32, 33, 34 and 35, extending from a short-wave component 31 up to a long-wave component 35.

Different filterings serve to split the wavelengths, i.e. into a very short-wave range Wa at a periodicity from 0.1 to 0,3 mm, a short-wave range Wb of 0.3 to 1 mm, a medium-wave range Wc of 1 to 3 mm, a medium-to-long wave range Wd of 3 to 10 mm and a long-wave range We of 10 to 30 mm.

Instead of splitting into five components as shown here, more or fewer components may be provided such that the measurement result 27 can be approximated with higher or lower accuracy. As mentioned above, the quantities of the resulting individual Fourier coefficients or amplitudes Wa, Wb, Wc, Wd and We are plotted on the y axis. Said Fourier coefficients or variances of the amplitudes of the ranges Wa to We filtered after the ranges 31 to 35 are the characteristic quantities mentioned initially.

Although the range of 0.1 to 30 mm indicated above could be extended, wavelengths below 0.1 mm or above 30 mm were found to be insignificant for determining properties of surfaces. Within the scope of the embodiment shown, only the Fourier coefficients or variances Wb, Wc and Wd are included with which the actual surface characteristics can be specified with sufficient accuracy. In the case of other applications for example on surfaces exhibiting other characteristics, other Fourier coefficients could be examined, for example Wc, Wd and We. It is also conceivable to specify in a different way the wavelength ranges assigned to the individual Fourier coefficients, such as, assign a wavelength range of 30 to 100 mm to the Fourier coefficient We.

Additionally to the Fourier coefficients or the variances shown, the total average of orange peel of the surface is also determined (not shown). To this end, a preferred application provides for evaluating the entire measuring range 27 and determining a deviation average. Such evaluation may be carried out over the entire wavelength ranges 31 to 35. Additionally, individual ranges may be rated or weighted higher or lower relative other ranges or wavelength ranges below the Wa range or above the We range may be included.

Figure 3:
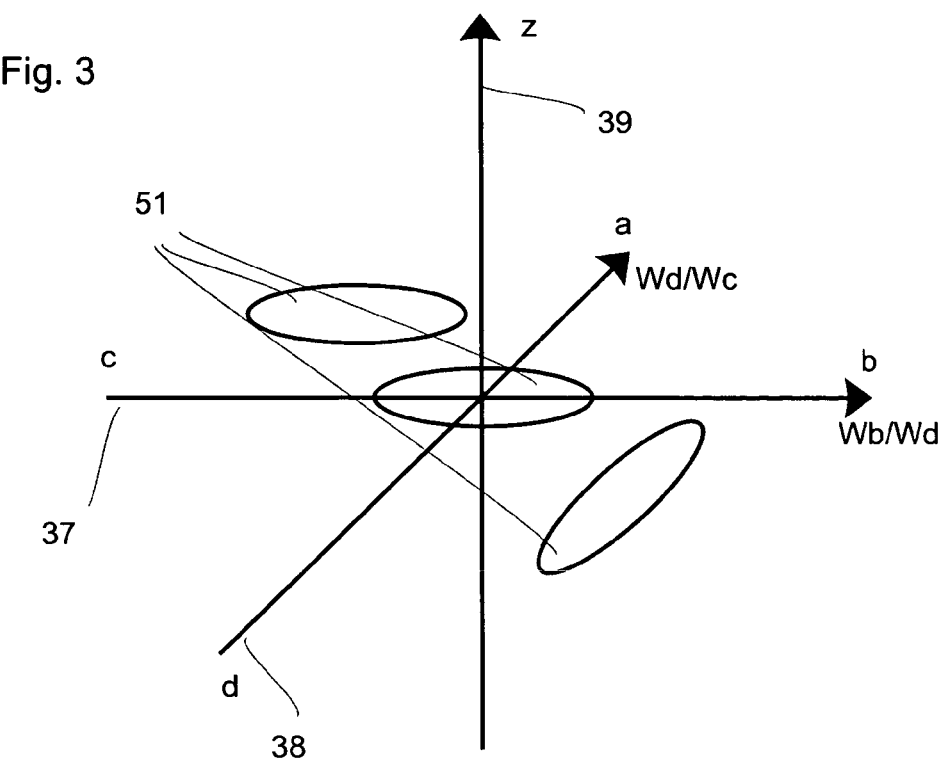
FIG. 3 is a plot of the characteristic quantities and derived quantities in a three-dimensional coordinate system.
Figure 3:
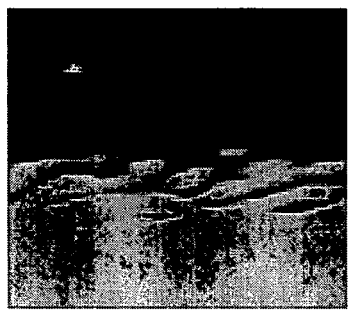
Figure 3:
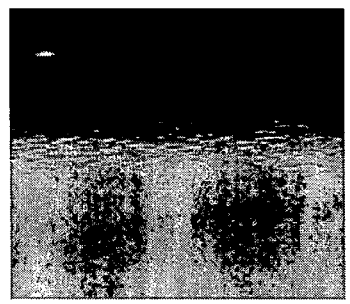
Figure 3:
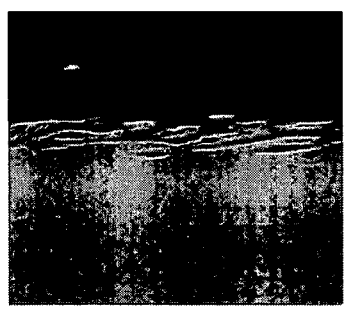
Figure 3:
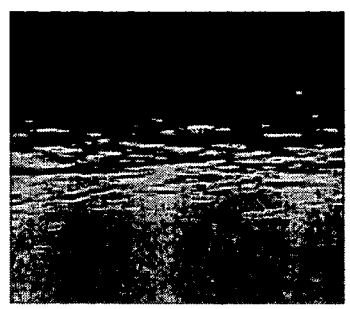

FIG. 3 is a representation of the derived quantities and the third derived quantity. The quotient from the Fourier coefficients or the values characteristic of the filtering ranges Wb and Wd are plotted on a first axis 37. This axis is thus the relationship of the short-wave proportion represented by the Fourier coefficient or the value Wb characteristic of the filtering range, versus the long-wave proportion represented by the Fourier coefficient or the value Wd characteristic of the filtering range. Said relationship will be referred to below as "longwave coverage" or "LW coverage". The ratio of the coefficients Wd and Wc is illustrated on the axis 38. A low value Wd/Wc represents a fibrous appearance and a high value Wd/Wc represents the intensity distribution shown in d which will be referred to below as "wet look". Accordingly the axis 38 represents the intensity of the "wet look". Orange peel is plotted on the Z axis 39 in ascending order from bottom to top, wherein an orange peel value of 0 would correspond to a substantially ideally smooth surface.

For example the rings 51 represent the permissible maximum values based on the interrelationship between Wb/Wd on the one hand and Wd/Wc on the other hand. This illustration also shows that a high Wd/Wc value or amount can be compensated by a correspondingly smaller Wb/Wd value or amount. The maximum value lines shown as circles might, however, be as well ellipsoid in shape or the like. Furthermore, the maximum value lines do not have to be concentric around the intersection point of the axes.

The lower part of FIG. 3 shows four typical intensity distributions a, b, c and d. These intensity distributions correspond to the extreme points a, b, c und d in the upper part of the Figure wherein one of the values is a maximum and the other is a mean value.

In the case of a distinct "wet look", i.e. with the ratio Wd/Wc having a high value, the intensity distribution shown in a would thus result. In the case of the extreme point d at which the ratio Wd/Wc has a low value, the intensity distribution shown under d will result wherein the optical impression may be referred to as fibrous. In the case that the ratio Wd/Wc is approximately even and the ratio Wb/Wd is small, i.e. the short-wave portion is small and the long-wave portion large, the intensity distribution shown under c will result. The intensity distribution shown under b results from a medium ratio Wd/Wc and a high ratio Wb/Wd, i.e. short-wave ranges are predominant.

Figure 4A:
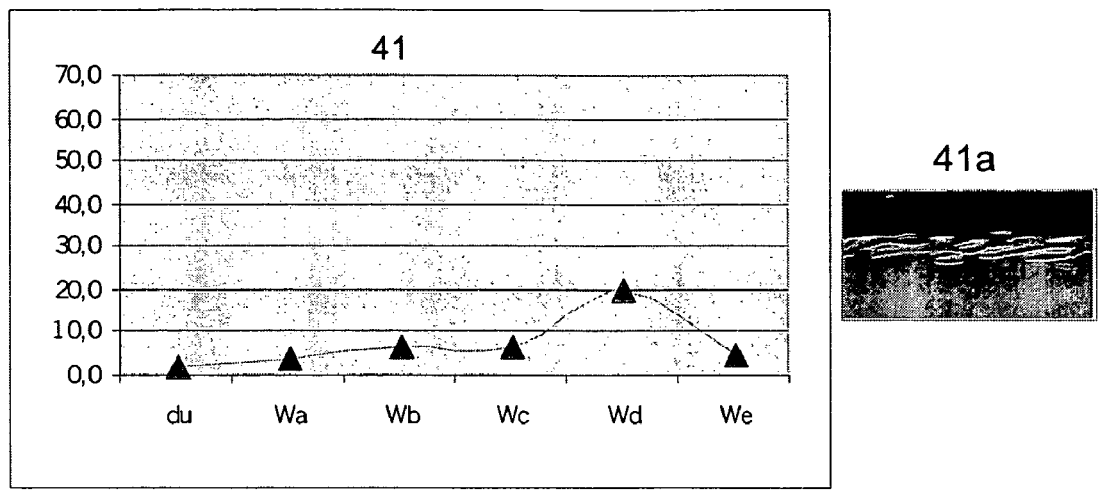
FIG. 4a depicts three measurement series for determining the characteristic quantities.
Figure 4A:
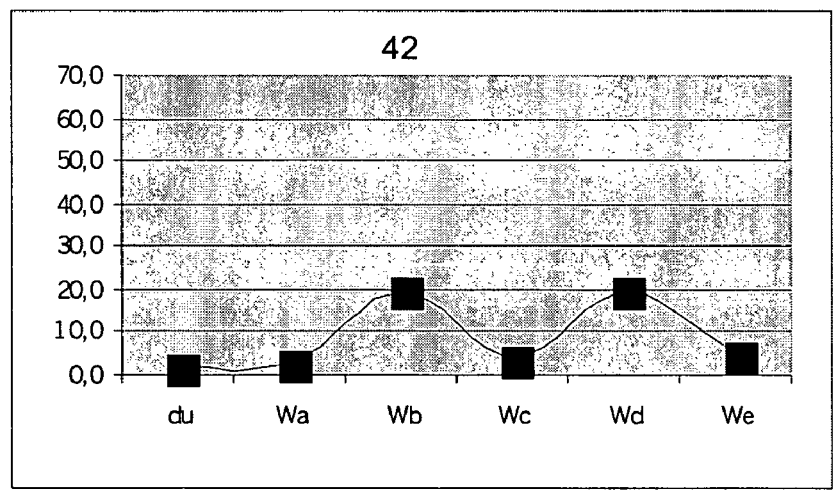
Figure 4A:
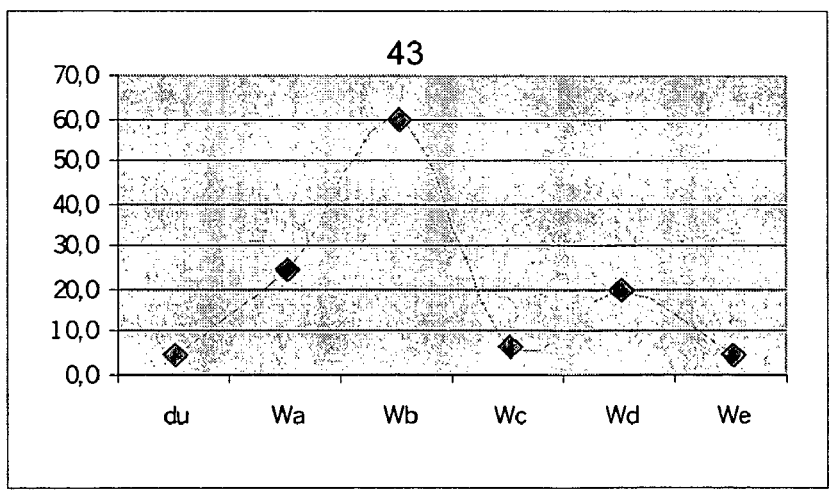
Figure 4B:
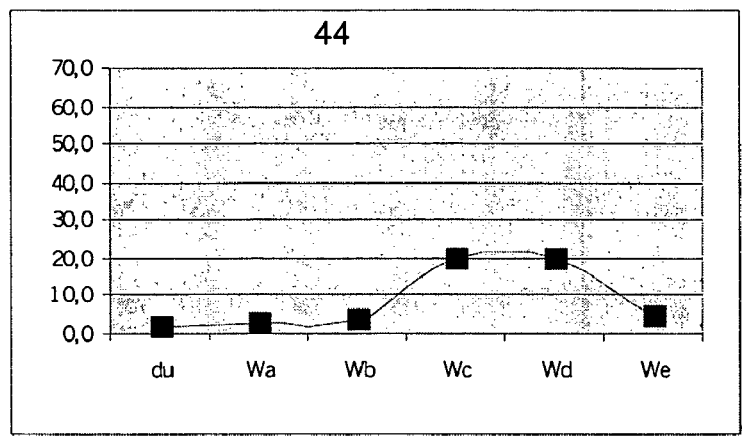
FIG. 4b depicts three further measurement series for determining the characteristic quantities.
Figure 4B:
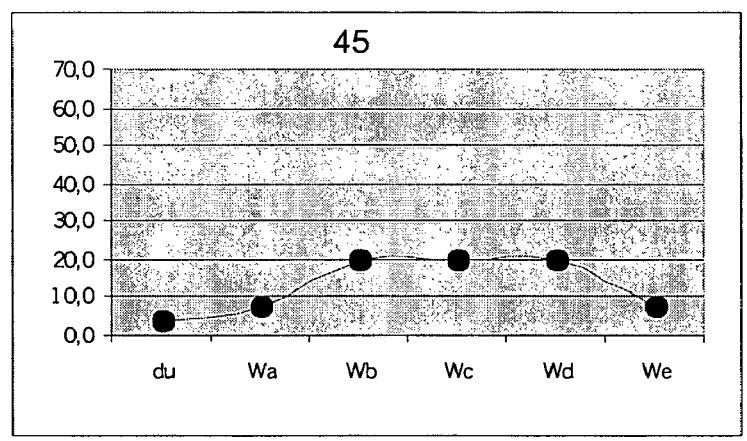
Figure 4B:
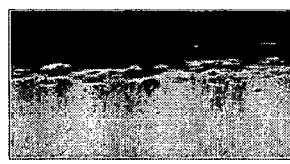
Figure 4B:
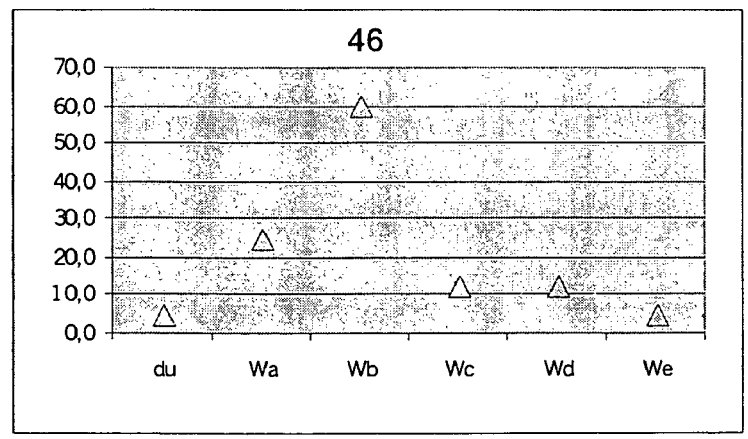
Figure 4C:
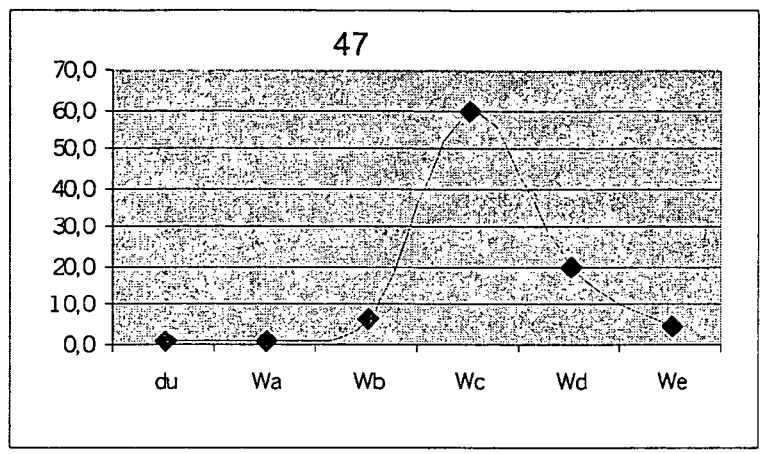
FIG. 4c depicts three further measurement series for determining the characteristic quantities.
Figure 4C:
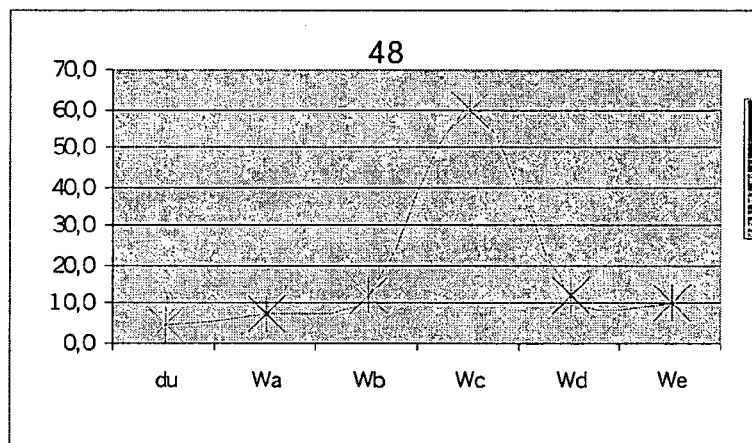
Figure 4C:
Figure 4C:
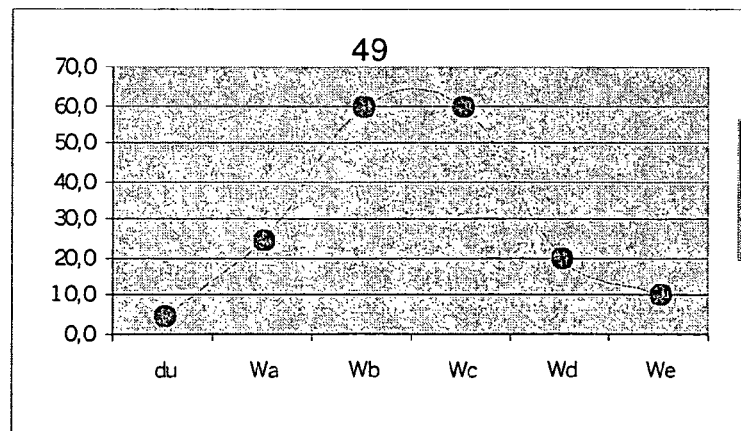
Figure 4C:
Figure 5:
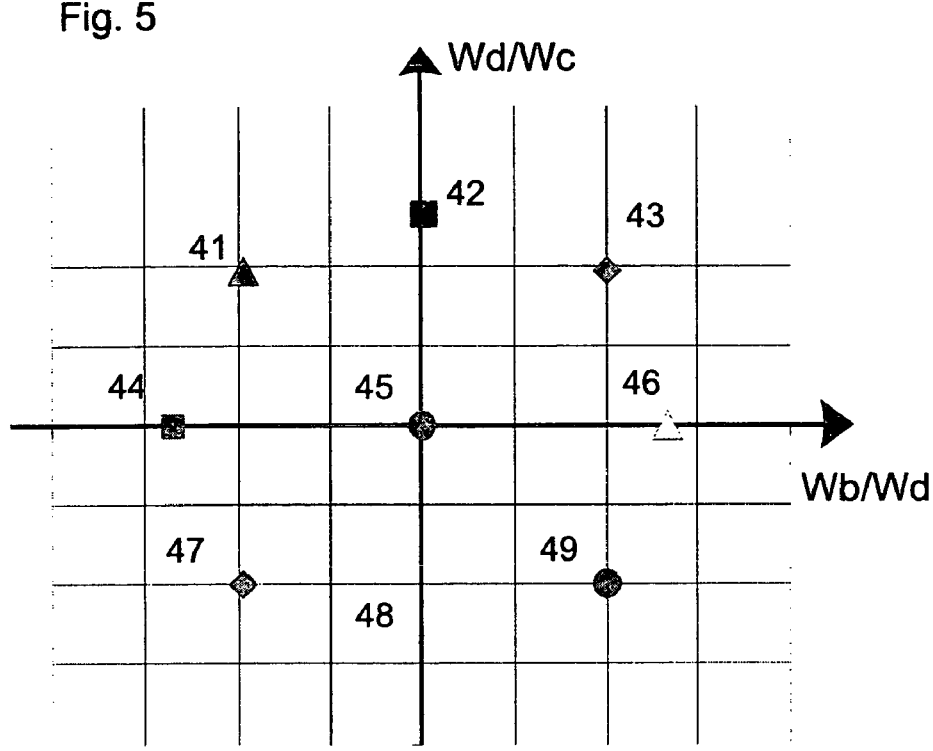
FIG. 5 is a representation of the derived quantities calculated from the characteristic quantities of FIGS. 4a-4c.

The FIGS. 4a, 4b and 4c show a total of nine series of measurements for determining the individual characteristic quantities Wa to Wd which are plotted into the graph shown in FIG. 5.

Illustration 41 shows an amplitude spectrum having a relatively high Wd ratio. This means that the long-wave portion predominates in this spectrum. This will therefore result in the image 41a which is similar to the image a in FIG. 3. According to the measurement results shown in the series of measurements 41, the Wb/Wd value is low and the Wd/Wc value is high. Thus, this value pair 41 is placed, as shown, in the top left quadrant of the coordinate system of FIG. 5. In this case the intensity distribution 41a will result which is characterized by the intense wet look appearance on the one hand and by the long-wave portions on the other hand.

In the series of measurements 42, the Wb/Wd ratio is approximately even and the Wd/Wc ratio is high. The corresponding value is therefore represented by the filled square in FIG. 5 approximately on the Wd/Wc axis in the upper portion. In this case, an intensity distribution will result as shown in FIG. 3 under a.

In the series of measurements 43, the Wb/Wd ratio is high and the Wd/Wc ratio is high. The corresponding value pair 43 in FIG. 5 is therefore in the top right-hand quadrant.

In the series of measurements 44, the Wb/Wd ratio is low and the Wd/Wc ratio is approximately even. Therefore, the corresponding value pair in FIG. 5 is approximately on the Wb/Wd axis in the left-hand portion. The resulting intensity distribution substantially corresponds to that shown in FIG. 3 under c.

In the series of measurements 45, both the Wb/Wd ratio and the Wd/Wc ratio values are approximately even. Therefore, the corresponding value pair is plotted in FIG. 5 at the intersection point of the Wb and the Wd axis on the one hand and the Wd and the Wc axis on the other hand.

In this conjunction we point out that the intersection point of the two axes in this embodiment is not the origin of the coordinate system in the mathematical sense because neither the ratio Wd/Wc nor the ratio Wb/Wd have a value 0 or negative values. Rather, in the present embodiment the origin of the coordinate system is characterized in that both ratios have a value of approximately 1. Thus, in this embodiment one could plot the values 2, 3, 4, etc. on the Wb/Wd axis to the right, and the values 1/2, 1/3, 1/4 etc. on the same axis to the left.

It is, however, also conceivable to apply instead of only the quotients, other mathematical operations such as the logarithm of the corresponding ratios. In this way the origin would again have coordinates (0,0) because the ratio of equal values will result in a value of approx. 1 and thus a logarithm of 0.

Image 45a shows the image resulting in the case of approximately even ratios. One can recognize that in this case neither a particularly high long-wave proportion nor a particularly high short-wave proportion is visible. Additionally, the image appears neither particularly fibrous nor having a particularly high "wet look" proportion.

In the series of measurements 46, the Wb/Wd ratio is high and the Wd/Wc ratio is approximately even. Therefore, the corresponding value pair 46 in FIG. 5 is approximately on the Wb/Wd axis in the right-hand portion. The resulting intensity distribution substantially corresponds to that shown in FIG. 3 under b.

In the series of measurements 47 in FIG. 4c the Wb/Wd value is low and the Wd/Wc value is also low. The corresponding value pair is therefore in the lower left-hand quadrant in FIG. 5.

In the series of measurements 48, the Wb/Wd ratio is approximately even and the Wd/Wc ratio is low. Therefore, the corresponding value pair is substantially on the Wd/Wc axis in the lower portion in FIG. 5. Image 48a shows an image having a high "wet look" proportion.

In the series of measurements 49, the Wb/Wd ratio is high and the Wd/Wc ratio is low. The corresponding value pair is therefore in the lower right-hand quadrant in FIG. 5. The image 49a will result with respect to these ranges. This means that in this case the image has high Wb/Wd coverage.

Figure 6:
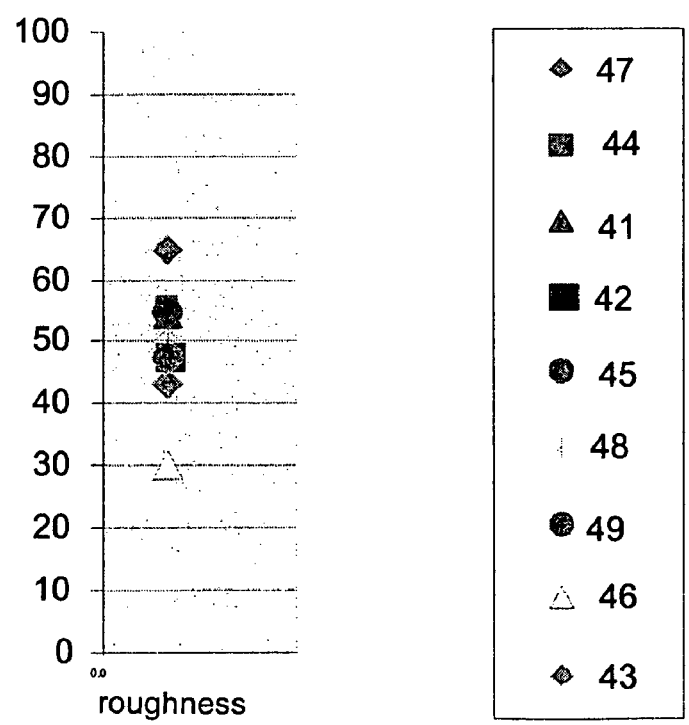
FIG. 6 is an illustration of a plot of the third derived quantity.

The overall orange peel is plotted in FIG. 6. One can see that for the series of measurements indicated, the average orange peel lies between 30 and 70. In this way all of the measured values can be illustrated in a two-dimensional graph as shown in FIGS. 5 and 6. These values result from an averaging over the entire measured range wherein geometric averaging, arithmetic averaging, integral functions and the like can be applied.

In addition to the scale from 0 to 100 shown in FIG. 6, other scales for example between 0 and 1 or logarithmic quantities and the like may also be applied.

In a further preferred embodiment, the Wb/Wd and Wd/Wc ratios plotted in FIG. 5 are standardized to the measured roughness. In the case of intense roughness, large deviations of the Wb/Wc and Wd/Wc ratios occur because the individual Fourier coefficients or variances will have larger values such that said standardization might achieve better comparability between individual measurement series.

In another preferred embodiment measured roughness could be included as a basic or offset value for evaluating the ratios.

The invention claimed is:

1. A method for characterizing optical properties of a surface comprising:
providing an apparatus configured to analyze the surface by performing the steps of:
determining a first characteristic quantity of roughness of the surface;
determining a second characteristic quantity of the roughness of the surface;
determining a first derived quantity by applying mathematical operations to at least said first characteristic quantity;
determining a second derived quantity by applying mathematical operations to at least said second characteristic quantity;
forming an interrelationship between said first and said second derived quantity which at least partially specifies the optical properties of the surface; and
illustrating said first and said second derived quantity in one common reference frame, wherein the first derived quantity, the second derived quantity and a third derived quantity are plotted in a coordinate system having three axes perpendicular relative one another, wherein a first axis is assigned to the first derived quantity, a second axis to the second derived quantity and a third axis to the third derived quantity.

2. The method according to claim 1, wherein the first and the second derived quantity are represented in a two-dimensional coordinate system and the third derived quantity is represented in the same coordinate system by distinguishable properties.

3. The method according to claim 2, wherein the distinguishable properties are selected from a group of optically distinguishable properties including color, gray level, hatching, numbers and symbols and combinations thereof.

* * * * *